Oct. 23, 1923.
C. T. CARLSON
UTENSIL HINGE
Filed March 1, 1923
1,471,776
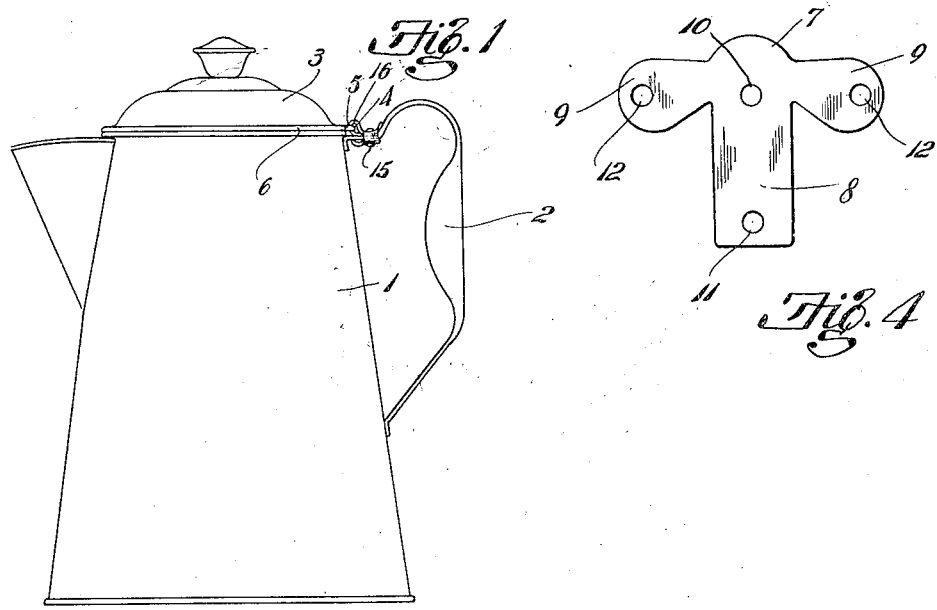
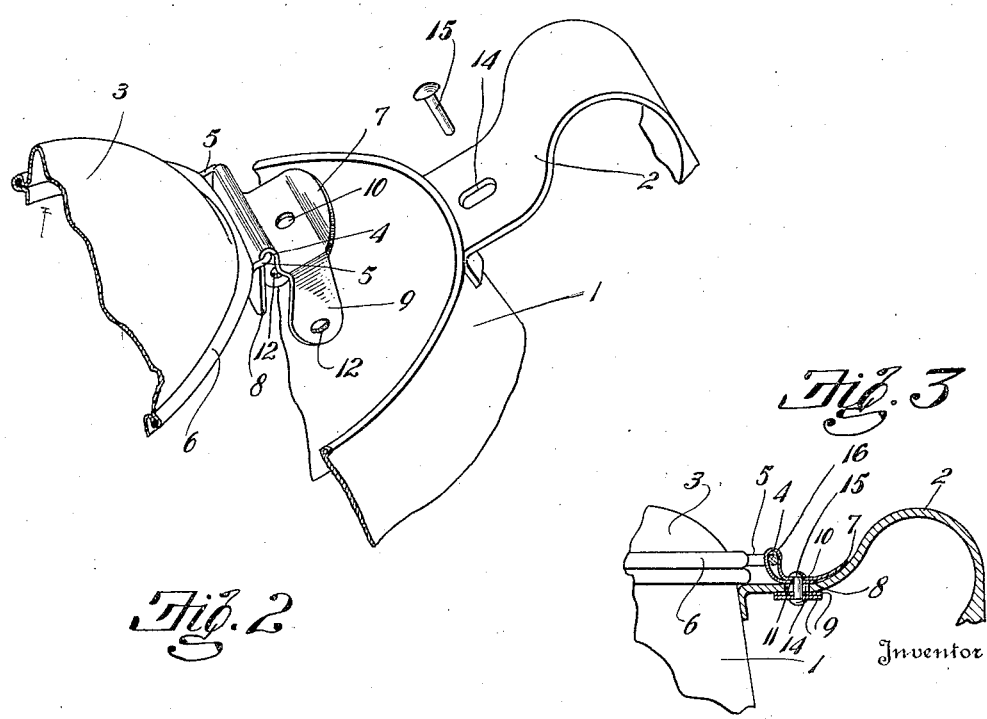
Inventor
Charles T. Carlson
By Frease and Bond Attorneys Patented Oct. 23, 1923.

1,471,776

UNITED STATES PATENT OFFICE.

CHARLES T. CARLSON, OF CANTON, OHIO.

UTENSIL HINGE.

Application filed March 1, 1923. Serial No. 622,151.

*To all whom it may concern:*

Be it known that I, CHARLES T. CARLSON, a citizen of the United States, residing at Canton, in the county of Stark and State of Ohio, have invented certain new and useful Improvements in Utensil Hinges, of which the following is a specification.

This invention relates to hinges for utensils such as coffee pots and the like, and has for its objects to provide a hinge bracket formed from a single sheet of pliable metal having a pair of ears arranged to be bent around the handle of the utensil, and a forward extension arranged to be bent back beneath the body of the bracket forming a tubular hinge knuckle to receive the pintle, which is carried by the lid of the receptacle, the body portion of the bracket, as well as this extension, and the ears being provided with apertures which register with an aperture in the handle when the bracket is placed in position thereon, a rivet or the like being passed through all of said apertures for securing the bracket to the handle.

The above and other objects may be attained by constructing the hinge in the manner illustrated in the accompanying drawings, in which—

Figure 1 is a side elevation of a coffee pot, showing the improved hinge applied thereto;

Fig. 2, a fragmentary, perspective view of portions of the coffee pot and lid showing the hinge bracket in position to be assembled thereon;

Fig. 3, a fragmentary elevation of portions of the coffee pot and lid showing the hinge in section; and Fig. 4, a plan view of the blank from which the hinge bracket is formed.

Similar numerals of reference refer to similar parts throughout the drawing.

A coffee pot of any usual construction is illustrated at 1 provided with the handle 2 and the lid 3. A hinge pintle 4 is carried by the lid 3, opposite ends of the pintle being bent inward as at 5 and extended within the bead 6 formed around the periphery of the lid.

The hinge bracket to which the invention pertains, is formed from a blank shown in Fig. 4, which is preferably curved at one end as shown at 7 and provided with the forward extension 8 and with the rounded ears 9 extending laterally from opposite sides of the blank, forming a substantially T-shaped blank as shown in Fig. 4. A central aperture 10 is formed in the blank, a similar aperture 11 being provided near the end of the forward extension 8 and similar apertures 12 being provided in the end portions of the ears 9.

In assembling the bracket upon the coffee pot, the curved rear portion 7 is bent upward as shown in Figs. 1, 2 and 3 to accommodate the curve of the handle 2, and the forward extension 8 is bent upward and then down, forming a U as shown in Fig. 2, permitting the same to receive the pintle 4, as shown in said figure, the ears 9 being bent downward at substantially right angles to the body portion of the bracket, as shown.

The lower end of the extension 8 is then bent backward beneath the body portion of the bracket, the aperture 11 therein registering with the aperture 10 and the bracket is placed over the handle 2, the aperture 10 and 11 registering with the slot 14 in the handle, the ears 9 being bent upward against the under side of the handle, the apertures 12 therein also registering with the apertures 10 and 11.

A rivet or the like 15 is then passed downward through all of the apertures in the bracket and through the slot 14, which provides for any variation in the bending of the bracket, permitting the lid to be properly seated upon the coffee pot. The lid will thus hinge upon the pintle 4 which, as shown in the drawings, is enclosed within the tubular knuckle portion 16 of the bracket, formed by bending the extension 8 thereof in the manner above described.

It will thus be seen that a hinge is provided comprising a one piece bracket encircling the handle and permanently attached thereto, a hinge pintle being fixed to the lid and journaled in the tubular knuckle portion of the hinge bracket.

I claim:—

1. In combination with a utensil having a handle and a lid, a hinge bracket comprising an extension bent back upon itself forming a tubular knuckle portion, ears upon the bracket bent around the handle, a rivet extended through the bracket and extension, and through the handle and ears and a hinge pintle fixed to the lid and journaled in said knuckle portion.

2. In combination with a utensil handle having an aperture, a hinge bracket formed from a substantially T-shaped blank comprising a central portion and lateral ears, the central portion being arranged to be bent back upon itself to form a hinge knuckle and the ears being arranged to be bent beneath the utensil handle, both ends of the central portion and the end portions of the ears being provided with apertures arranged to register with each other and with the aperture in the handle to receive a rivet.

3. In combination with a utensil handle having an elongated aperture, a hinge bracket formed from a substantially T-shaped blank comprising a central portion and lateral ears, the central portion being arranged to be bent back upon itself to form a hinge knuckle and the ears being arranged to be bent beneath the utensil handle, both ends of the central portion and the end portions of the ears being provided with apertures arranged to register with each other and with the aperture in the handle to receive a rivet.

CHARLES T. CARLSON.